US007558428B2

(12) United States Patent
Shen et al.

(10) Patent No.: US 7,558,428 B2
(45) Date of Patent: Jul. 7, 2009

(54) ACCELERATED VIDEO ENCODING USING A GRAPHICS PROCESSING UNIT

(75) Inventors: Guobin Shen, Beijing (CN); Shipeng Li, Redmond, WA (US); Guangping Gao, Beijing (CN)

(73) Assignee: Microsoft Corporation, Redmond, WA (US)

( * ) Notice: Subject to any disclaimer, the term of this patent is extended or adjusted under 35 U.S.C. 154(b) by 812 days.

(21) Appl. No.: 10/939,983

(22) Filed: Sep. 13, 2004

(65) Prior Publication Data

US 2006/0056708 A1 Mar. 16, 2006

(51) Int. Cl.
*G06K 9/74* (2006.01)

(52) U.S. Cl. .................. 382/236; 348/402.1; 375/240.2; 358/1.1; 710/260; 710/106; 345/468

(58) Field of Classification Search ................. 382/236; 710/260, 106; 358/448; 345/468; 348/402.1
See application file for complete search history.

(56) References Cited

U.S. PATENT DOCUMENTS

| | | | | | |
|---|---|---|---|---|---|
| 4,179,709 | A | * | 12/1979 | Workman | ................. 375/240.2 |
| 4,791,677 | A | | 12/1988 | Mori et al. | |
| 4,816,906 | A | * | 3/1989 | Kummerfeldt et al. | ... 348/402.1 |
| 4,937,761 | A | * | 6/1990 | Hassett | ........................ 345/468 |
| 4,979,095 | A | * | 12/1990 | Ghaffari | ..................... 710/106 |
| 5,210,605 | A | * | 5/1993 | Zaccarin et al. | ........ 375/240.16 |
| 5,262,965 | A | * | 11/1993 | Putnam et al. | ................ 358/1.1 |
| 5,689,592 | A | | 11/1997 | Ericsson et al. | |
| 5,784,076 | A | | 7/1998 | Crump et al. | |

(Continued)

FOREIGN PATENT DOCUMENTS

EP 1370086 12/2003

(Continued)

OTHER PUBLICATIONS

Kelly et al., "Graphics Hardware for Gradient Based Motion Estimation" Proceedings of the SPIE- The International Society for Optical Engineering SPIE-USA, vol. 5309. No. 1, 2003, pp. 92-103.

(Continued)

*Primary Examiner*—Brian Q Le
*Assistant Examiner*—Aklilu k Woldemariam
(74) *Attorney, Agent, or Firm*—Lee & Hayes, PLLC

(57) ABSTRACT

The systems and methods described herein are directed at accelerating video encoding using a graphics processing unit. In one aspect, a video encoding system uses both a central processing unit (CPU) and a graphics processing unit (GPU) to perform video encoding. The system implements a technique that enables the GPU to perform motion estimation for video encoding. The technique allows the GPU to perform a motion estimation process in parallel with the video encoding process performed by the CPU. The performance of video encoding using such a system is greatly accelerated as compared to encoding using just the CPU.

In another aspect, data related to motion estimation is arranged and provided to the GPU in a way that utilizes the capabilities of the GPU. Data about video frames may be collocated to enable multiple channels of the GPU to process tasks in parallel. The depth buffer of the GPU may be used to consolidate repeated calculations and searching tasks during the motion estimation process. The use of frame collocation and depth buffer enables the GPU to be better utilized and to further accelerate video encoding.

37 Claims, 15 Drawing Sheets

U.S. PATENT DOCUMENTS

| | | |
|---|---|---|
| 5,844,612 A | 12/1998 | Israelsen |
| 6,038,350 A | 3/2000 | Iwase et al. |
| 6,049,362 A | 4/2000 | Butter et al. |
| 6,067,322 A * | 5/2000 | Wang .................... 375/240.17 |
| 6,072,830 A | 6/2000 | Proctor et al. |
| 6,122,077 A * | 9/2000 | Kaji ........................... 358/448 |
| 6,167,085 A | 12/2000 | Saunders et al. |
| 6,222,883 B1 * | 4/2001 | Murdock et al. ....... 375/240.16 |
| 6,246,719 B1 * | 6/2001 | Agarwal ................ 375/240.16 |
| 6,349,115 B1 | 2/2002 | Tahara et al. |
| 6,356,589 B1 | 3/2002 | Gebler et al. |
| 6,473,461 B1 | 10/2002 | Wang |
| 6,473,463 B2 | 10/2002 | Agarwal |
| 6,760,478 B1 | 7/2004 | Adiletta et al. |
| 7,158,571 B2 | 1/2007 | Wang et al. |
| 2003/0037194 A1 * | 2/2003 | Mukherjee .................. 710/260 |
| 2003/0123549 A1 | 7/2003 | Yang et al. |
| 2003/0151608 A1 | 8/2003 | Chung et al. |

FOREIGN PATENT DOCUMENTS

| | | |
|---|---|---|
| WO | WO03075116 | 9/2003 |
| WO | WO2005020582 | 3/2005 |

OTHER PUBLICATIONS

Kelly, "General Purpose Graphics Hardware for Accelerating Motion Estimation" Irish Machine Vision and Image Processing Conference (IMVIP) Sep. 2003, University of Ulster, Coleraine, Ireland.

Kunh, "Fast MPEG-4 Motion Estimation: Processor Based and Flexible VLSI Implementations" Journal of VLSI Signal Video Processing Systems for Signal, Image, and Video Technology, Springer, New York, NY, US, vol. 23, No. 1, Oct. 1999 pp. 67-92.

EPO Communication with Search Report dated Apr. 18, 2006, from counterpart EP patent application, European Patent Application No. 05108157.8, 4 pages.

* cited by examiner

ACCELERATED VIDEO ENCODING USING A GRAPHICS PROCESSING UNIT

TECHNICAL FIELD

The systems and methods discussed herein relate to video processing and, in particular, to accelerated video encoding.

BACKGROUND OF THE INVENTION

Encoding digital multimedia content typically requires significant amount of processing power, especially for real-time applications. In particular, video encoding is computationally intensive and typically requires a computer to have a fast central processing unit (CPU). In video encoding, motion estimation is often the most complex process. Motion estimation refers to the process of finding the best prediction for a block in the current frame from a previously encoded reference frame(s). Motion estimation is commonly conducted via searching. To capture the real motion for better prediction and visual quality, the search range cannot be very small. Accordingly, because the computational complexity of motion estimation is high, motion estimation occupies a significant portion of the processing power and resources that are needed for the whole encoding process and is usually the bottleneck.

Thus, there is a need for computers to more efficiently perform motion estimation so that video encoding can be accelerated without simply improving the speed of CPUs.

SUMMARY OF THE INVENTION

The systems and methods described herein are directed at accelerating video encoding using a graphics processing unit. In one aspect, a video encoding system uses both a central processing unit (CPU) and a graphics processing unit (GPU) to perform video encoding. The system implements a technique that enables the GPU to perform motion estimation for video encoding. The technique allows the GPU to perform a motion estimation process in parallel with the video encoding process performed by the CPU. The performance of video encoding using such a system is greatly accelerated as compared to encoding using just the CPU.

In another aspect, data related to motion estimation is arranged and provided to the GPU in a way that utilizes the capabilities of the GPU. Data about video frames may be collocated to enable multiple channels of the GPU to process tasks in parallel. The depth buffer of the GPU may be used to consolidate repeated calculations and searching tasks during the motion estimation process. The use of frame collocation and depth buffer enables the GPU to be better utilized and to further accelerate video encoding.

DETAILED DESCRIPTION

The processing power of graphics processing units (GPUs) has been increasing much faster than that of central processing units (CPUs). Computers are increasing equipped with high performance GPUs. The described systems and methods utilize the processing power of GPU to handle motion estimation. In order to use a GPU to accelerate video encoding, a different video encoding architecture is needed such that the CPU and the GPU can be operated in parallel. An example of such architecture is described below.

Figure 1:
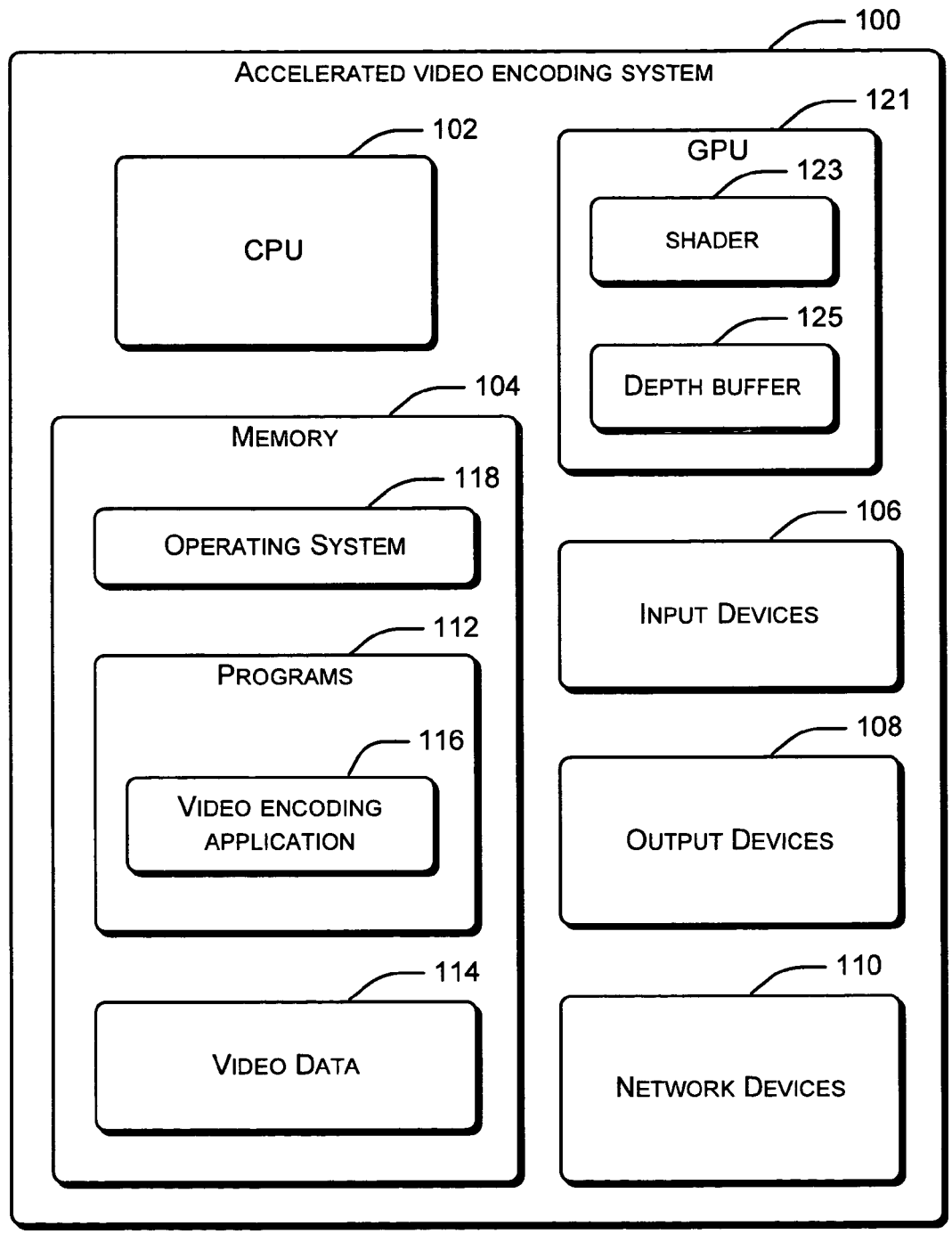
FIG. 1 illustrates accelerated video encoding system within which the described systems and methods can be either fully or partially implemented.

FIG. 1 illustrates accelerated video encoding system 100 within which the described systems and methods can be either fully or partially implemented. Accelerated video encoding system is only one example of a computing system and is not intended to suggest any limitation as to the scope of the use or functionality of the invention.

Accelerated video encoding system 100 is configured to receive video signal from a variety of sources. Accelerated video encoding system 100 is also configured to encode the video signal into digital video data such as a video bitstream. Accelerated video encoding system 100 may handle the digital video data in a variety of ways, such as storing the data, displaying the data on a display device, providing the data to other devices through a network, or the like.

The components of accelerated video encoding system 100 may include central processing unit (CPU) 102, graphics processing unit (GPU) 121, and memory 104. CPU 102 may be configured to perform various kinds of processing tasks. For video processing, CPU 102 may be configured to identify frames from a video signal and encode the frames into digital video data. CPU 102 may also be configured to interact with GPU 121 and to enable GPU 121 to perform some of the tasks associated with encoding the digital video data, such as the tasks associated with motion estimation.

GPU 121 is primarily configured to process and render graphics. GPU 121 typically includes multiple channels for processing texels, which are units associated with texture. As shown in FIG. 1, GPU 121 may include a shader 123, which is a programmable component configured to process graphical data, such as data related to texture. Shader 123 may include a vertex shader, pixel shader, or any other appropriate components. Vertex shader is configured to perform graphics operations on a per-vertex basis and pixel shader is configured to perform graphics operations on a per-pixel basis.

With the appropriate instructions and data, GPU 121 may be configured to perform video encoding tasks, such as motion estimation. Accelerated video encoding system 100 may use GPU 121 to provide motion estimation data to CPU 102, which uses the motion estimation data to encode digital video data. To further accelerate the video encoding process, information is provided to GPU 121 in a way that allows GPU 121 to use its multiple channels to determine motion estimation data.

A typical motion estimation process involves dividing a video frame into rectangular blocks and computes motion vectors for the blocks. A motion vector (MV) represents the displacement of the block (in the x-y pixel plane) with respect to a reference image. For each block, a number of motion vector candidates are examined. The number of motion vector candidate can be static (such as Full Search, Three-step search, etc.) or dynamic (such as MVFast, PMVFast, Diamond Search, etc). For each motion vector candidate, a block evaluated in the current frame is compared with the corresponding block from the reference images, which is displaced by the motion vector. After testing all candidates, the one with the best match is selected. This match may be found by comparing the Sum of Absolute pixel Differences (SAD) or Mean Square Error (MSE) between the current block and the displaced reference block. More advanced motion estimation techniques that adopt more complex criteria when comparing the matches may also be used. For example, an R-D based metric, which does not only considering the SAD or MSE but also considering the cost in coding the resulting motion vectors simultaneously, is adopted by H.264 and WMV9 and may be also used.

GPU 121 may be configured in a variety of manner. In one embodiment, GPU 121 is compatible with MICROSOFT® DIRECTX® 9 (DX9). DX9 has eight parallel pixel engines, which means eight pixels can be processed simultaneously. DX9 also supports vertex shader, pixel shader, multi-element texture, multiple rendering target, depth buffer, and the like. The use of multiple rendering targets enables multiple computation tasks to be finished in one shader run. The vertex shader supports static flow control, enhanced instruction set, and multiple instruction slots and new registers. The pixel shader version supports enhanced instruction set, increased input and temporary registers, multiple texture, multiple arithmetic instruction slots, source register swizzling, source register modifiers and destination register writing masks. Both vertex shader and pixel shader support IEEE 1394 32-bit floating-point precision.

GPU 121 may also include depth buffer 125, which may also be referred to as Z-buffer or W-buffer. Depth buffer 125 is a component of GPU 121 configured to store depth information to be used by graphics rendering components, such as MICROSOFT® DIRECT3D®. Depth buffer 125 may be used to solve occlusion problem. For example, in rendering a 3-D scene to a target surface, GPU 121 can use the memory in an associated depth-buffer surface as a workspace to determine how the pixels of rasterized polygons occlude one another. An off-screen surface may be used as the target to which final color values are written. The depth-buffer surface that is associated with the render-target surface is used to store depth information concerning how deep each visible pixel is in the scene.

Accelerated video encoding system 100 may use depth buffer 125 to enhance the capabilities of GPU 121 for determining the motion estimation data. For example, depth buffer 125 may be used to store data, such as flags, during the motion estimation process so that redundant processes are not repeated.

Memory 104 is used by components of accelerated video encoding system 100 to store data. For example, memory 104 may be used to store video data 114, which may be accessed by CPU 102. In example configuration, memory 210 is shared by CPU 102 and GPU 121. The sharing of memory 104 enables data to be efficiently and effectively communicated between CPU 102 and GPU 121. As shown in FIG. 1, memory 104 may also include computer programs 112, such as video encoding application 116. Video encoding application 116 is configured to encode video signals into digital video data using both CPU 102 and GPU 121. Video encoding application 116 is configured to process the video signals as video frames, such as Intra frame (I-frame), a predicted frame (P-frame) or a bi-directional predicted frame (B-frame). Specifically, video encoding application 116 is configured to provide instructions for utilizing GPU 121 for determining motion estimation data, such as motion vectors and difference values. Difference values may include sum of absolute difference (SAD) values, mean square error (MSE) values, or R-D based metric values.

Accelerated video encoding system 100 can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, gaming consoles, distributed computing environments that include any of the above systems or devices, and the like.

Accelerated video encoding system 100 typically includes a variety of computer-readable media. Such media can be any available media that is accessible by accelerated video encoding system 100 and includes both volatile and non-volatile media, removable and non-removable media. Memory 104 includes computer-readable media in the form of volatile memory, such as random access memory (RAM), and/or non-volatile memory, such as read only memory (ROM). A basic input/output system (BIOS), containing the basic routines that help to transfer information between elements within accelerated video encoding system 100, such as during start-up, is stored in memory 104. Memory 104 typically contains data and/or program modules that are immediately accessible to and/or presently operated on by CPU 102 and GPU 121.

Memory 104 can also include other removable/non-removable, volatile/non-volatile computer storage media. By way of example, a hard disk drive may be included for reading from and writing to a non-removable, non-volatile magnetic media; a magnetic disk drive may be included for reading from and writing to a removable, non-volatile magnetic disk (e.g., a "floppy disk"); and an optical disk drive may be included for reading from and/or writing to a removable, non-volatile optical disk such as a CD-ROM, DVD, or any other type of optical media.

The disk drives and their associated computer-readable media provide non-volatile storage of computer-readable instructions, data structures, program modules, and other data for accelerated video encoding system 100. It is to be appreciated that other types of computer-readable media which can store data that is accessible by accelerated video encoding system 100, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement accelerated video encoding system 100.

Accelerated video encoding system 100 can include a variety of computer-readable media identified as communication media. Communication media typically embodies computer-readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

A user can enter commands and information into accelerated video encoding system 100 via input devices 106 such as a keyboard and a pointing device (e.g., a "mouse"). Other input devices 106 may include a microphone, joystick, game pad, controller, satellite dish, serial port, scanner, touch screen, touch pads, key pads, and/or the like. Output devices 108 may include a CRT monitor, LCD screen, speakers, printers, and the like. Accelerated video encoding system 100 may include network devices 110 for connecting to computer networks, such as local area network (LAN), wide area network (WAN), and the like.

Figure 2:
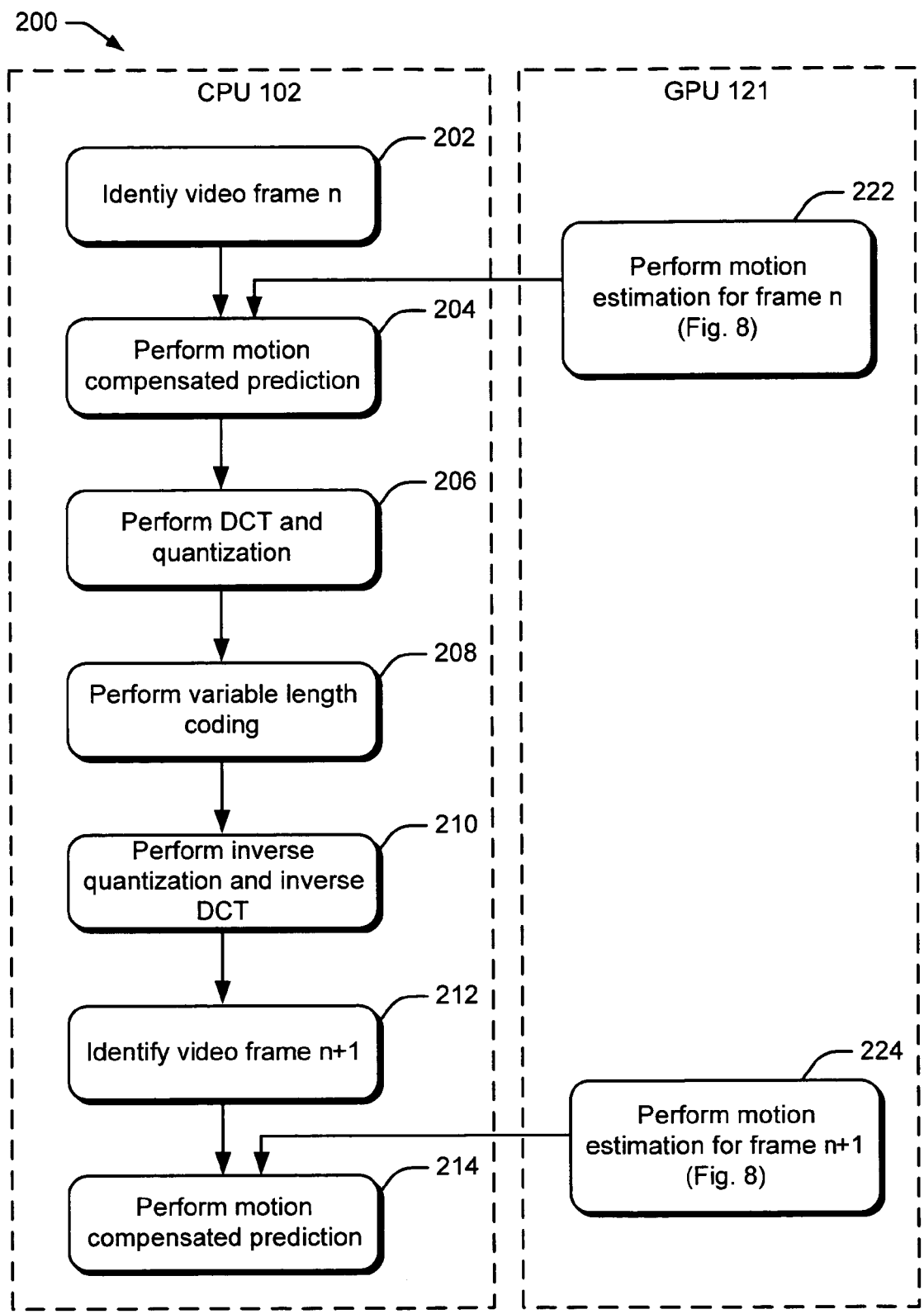
FIG. 2 illustrates an example process for encoding video signals into digital video data.

FIG. 2 illustrates an example process 200 for encoding video signals into digital video data. Process 200 may be employed by a central processing unit and a graphics processing unit in parallel. For example, CPU 102 and GPU 121 of FIG. 1 may use process 200 to accelerate the encoding of digital video data.

Process 200 begins when a video signal has been received. At block 202, a particular video frame (i.e. video frame n) of the video signal is identified by CPU 102. CPU 102 may provide video frame n to GPU 121 for processing. Alternatively, GPU 121 may independently have access to video frame n. At block 222, GPU 121 performs motion estimation for frame n. An example process for motion estimation will be discussed in conjunction with FIG. 8. Briefly stated, GPU 121 determines motion vectors associated with video frame n by determining and analyzing motion estimation data associated with the frame. GPU 121 may receive seed positions for use as starting points for searching the motion vectors.

At block 204, CPU 102 performs motion compensated prediction using the motion vectors provided by GPU 121. At block 206, discrete cosine transform (DCT) and quantization are performed on the video frame n. At block 208, CPU 102 performs variable length coding. Video frame n can then be encoded into the digital video data.

Video frame n may be used as a reference frame for a subsequent B-frame or P-frame. At block 210, inverse quantization and inverse DCT are performed on the processed video frame n.

At block 212, another video frame (i.e. video frame n+1) of the video signal is identified by CPU 102. GPU 121 continues to perform motion estimation for frame n+1 at block 224 and CPU 102 continues to encode the digital video data for the frame at block 214.

It is to be appreciated GPU 121 can perform motion estimation in parallel with the video encoding process performed by CPU 102. Specifically, GPU may perform motion estimation for frames in the video signal without the need to synchronize its operations with CPU 102. The performance of this parallel video encoding process is a significant improvement over the performance of video encoding using only CPU 102.

Figure 3:
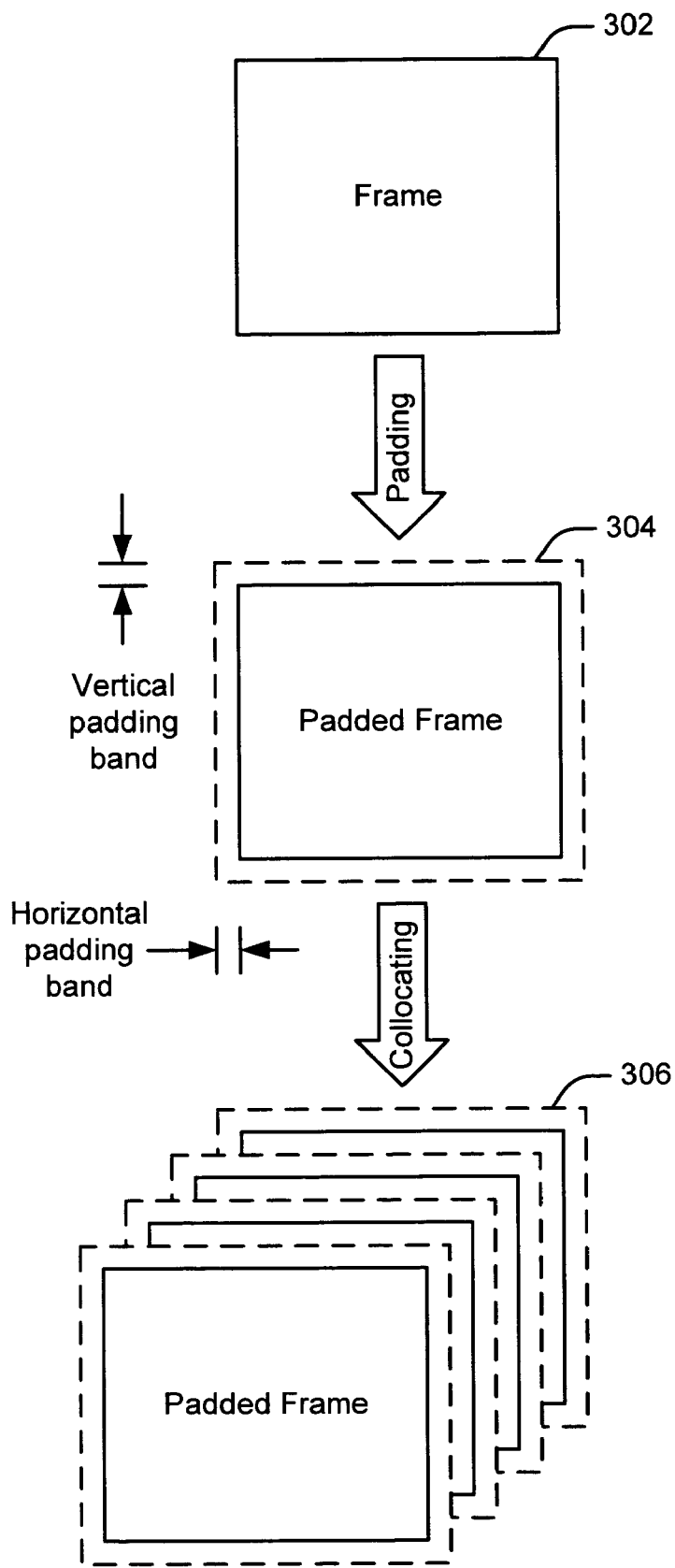
FIG. 3 shows a graphical representation of how a frame is prepared for processing by a graphics processing unit.

FIG. 3 shows a graphical representation of how a frame is prepared for processing by a graphics processing unit. Frame 302 is a frame in a video signal and is held by the GPU for processing. To calculate motion vectors for pixels at the boundary, frame 302 are padded with a horizontal band and a vertical band of pixels. The resulting padded frame 304 includes pixels at the bands that may be used as neighboring pixels for the purpose of calculating unrestricted motion vectors (UMV) for the pixels at the edge of frame 302.

UMV is a common standard technique for video coding standards. The padding process can be achieved with many different methods, such as implicit method and explicit method. The implicit method achieves the padding effect by selectively setting the render state and texture address mode. However, the implicit method depends on the capability of the underlying GPU (e.g. the drivers of the GPU). For example, the driver may need to support the linear address mode where the texture size can be the same as the picture size. Such capability is usually supported by the mainstream GPUs. For some drivers, the texture size is limited to be the integer power of two. The explicit padding process can be achieved by a simple shader programming. For the frame to be padded, the vertex shader may set up the texture addresses to point to the boundary pixel. The pixel shader may render the boundary pixel values to the padded area.

As shown in FIG. 3, padded frame 304 may be collocated to create multiple collocated frames 306. The purpose of creating collocated frames 306 is to manipulate frame 302 so that the four channels of a texel will correspond to pixels. In this way, the four parallel channels of the GPU will be fully utilized. Collocating frames may improve the computational efficiency by four-fold when the GPU properly selects four pixels for processing and maps the pixels to the four channels of a texel.

Motion estimation is performed by evaluating difference values, such as the sum of absolute difference (SAD), from one reference block to another. These reference blocks are typically inside certain window around the predicted position (i.e. the seed). The offset between these reference blocks are predetermined according to the search algorithms. If the four channels of a texel contain the pixels that are offset according to a predetermined value (e.g. according to the search algorithms), then evaluation of SAD of one texel search point will be equivalent to the evaluation of SADs of four candidate search points. The texels addresses may be linearly interpolated from the positions of the vertices. Since the address of one specific texel may not be distinguishable from other texels between two vertices, the resulting texels over which the SAD is to be computed may preferably be uniformly spaced. Using this technique, the pixel shader will perform the same operation on the intermediate texels between two vertices.

Figure 4:
FIG. 4 illustrates an example macroblock without collocation or pixel shift.

FIG. 4 illustrates an example macroblock 400 without collocation or pixel shift. As shown in FIG. 4, macroblock 400 includes 16×16 pixels. However, macroblock 400 may include other pixel configurations, such as 8×8 pixels, 4×4 pixels, etc. Pixels in the first line are labeled from 0-15 for discussion purposes.

Figure 5:
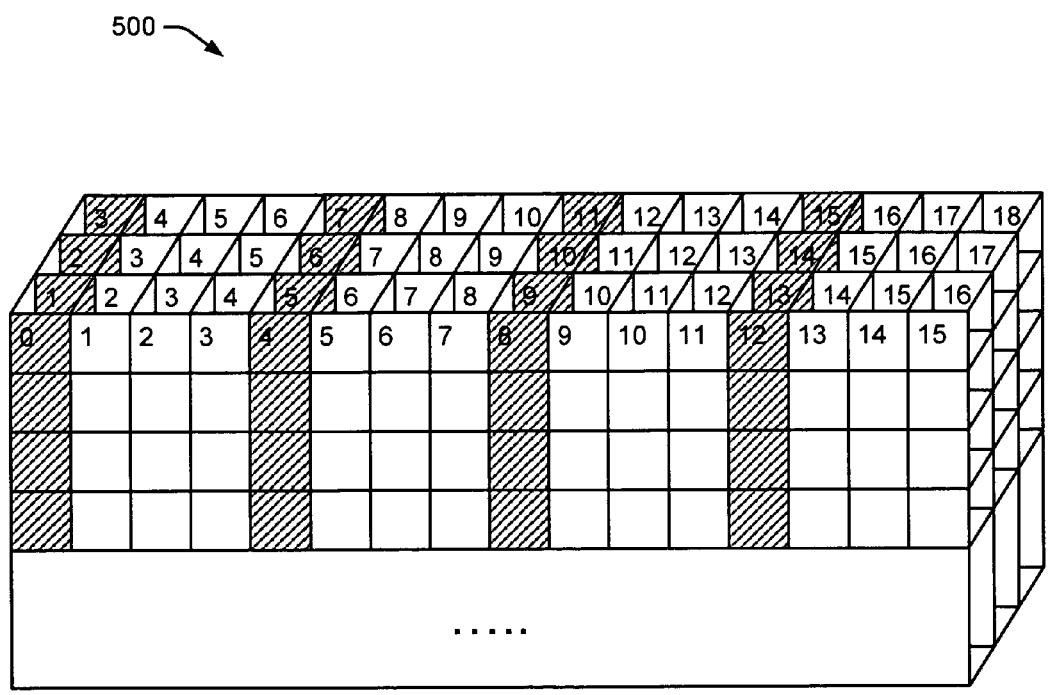
FIG. 5 illustrates example macroblocks of collocated frames with a 1-pixel offset.
Figure 6:
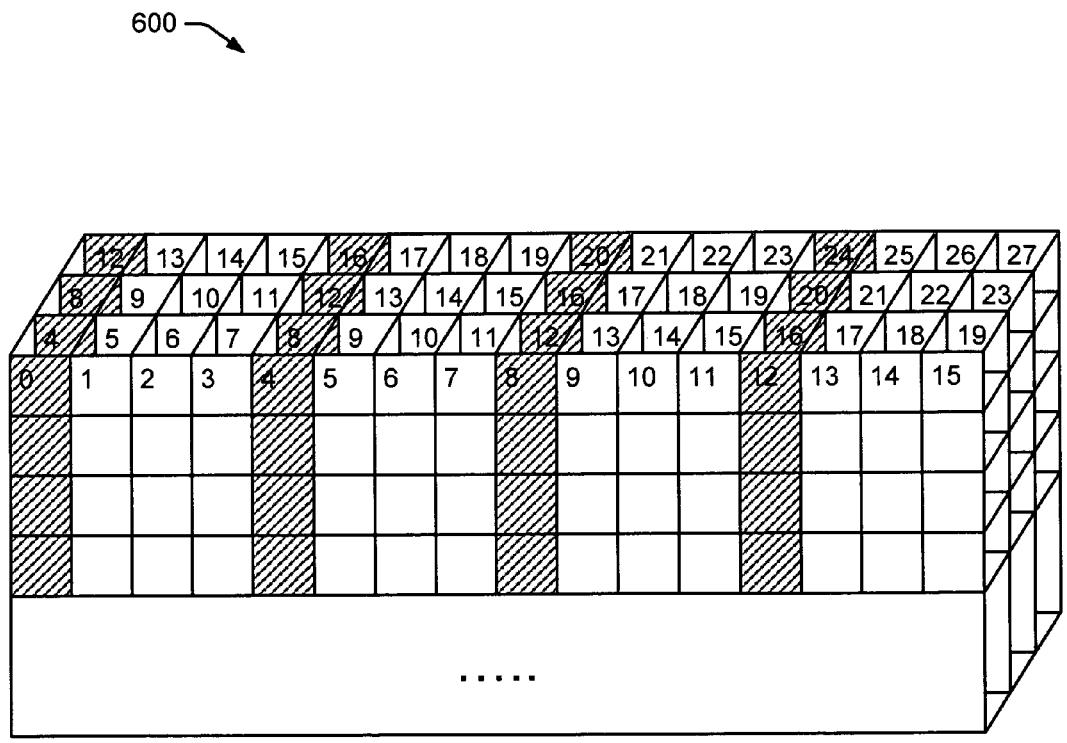
FIG. 6 illustrates example macroblocks of collocated frames with a 4-pixel offset.

FIG. 5 illustrates example macroblocks 500 of collocated frames with a 1-pixel offset. FIG. 6 illustrates example macroblocks 600 of collocated frames with a 4-pixel offset. In the figures, only one line of each of the macroblocks 500 is labeled. Other lines of the macroblock are manipulated in the same fashion and the distance of between two neighboring lines is equal to the pitch of the texture.

For macroblock 500 shown in FIG. 5, when the difference values, such as the sum of absolute difference (SAD), of one reference texel macroblock at position (x,y) is calculated, the values of four reference pixel macroblock at position (x,y), (x+1,y), (x+2,y) and (x+3,y) are known simultaneously by extracting the values from the four corresponding texel channels. For macroblock 600 shown in FIG. 6, the difference values of position (x,y), (x+4,y), (x+8,y) and (x+12,y) are known if the mapping is used.

It is to be appreciated that a four-fold speedup may be achieved. As shown by the pixels indicated by hashed lines, the original 16×16 pixel block may also be conceptually squeezed into a 4×16 texel block.

Figure 7A:
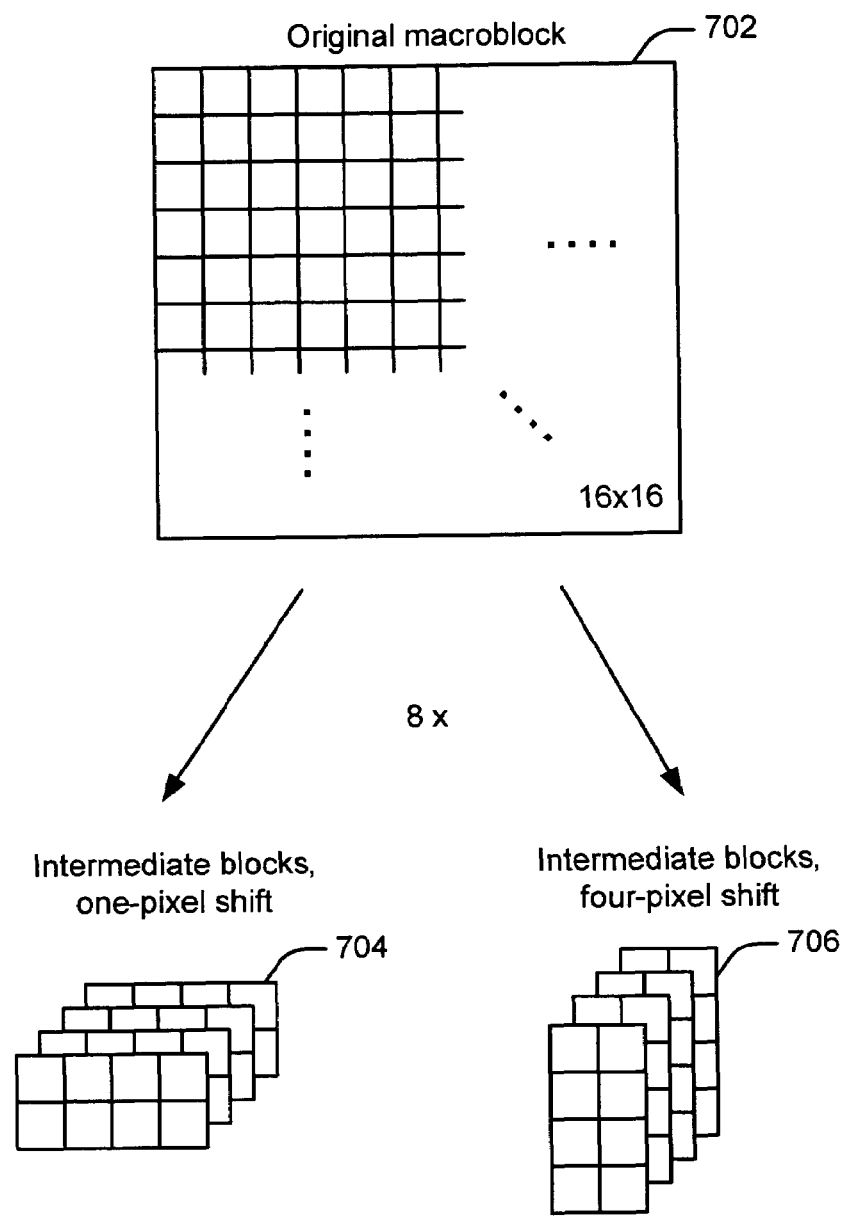
FIG. 7A shows an example macroblock for a particular video frame.

FIG. 7A shows an example macroblock 702 for a particular video frame. To encode a video frame into digital video data, such as a video bitstream, the video frame is typically divided into multiple macroblocks, such as macroblock 702. A graphics processing unit typically has instruction slots constraint about how data may be inputted. For example, the pixel shader of a graphics processing unit may only be able to process a certain number of texels at one time. In one example graphics processing unit, only 32 texels may be processed at one time by four separate channels. In this example, the macroblock 702 may be divided eight groups of four intermediate texel blocks, each containing 8 pixels. The intermediate texel blocks may be in a variety of dimensions, depending on the amount of pixel shift in the macroblock. As shown in FIG. 7A, intermediate texel blocks 704 has a 4×2 dimension corresponding to a 1-pixel shift. Intermediate texel blocks 706 has a 2×4 dimension corresponding to a 4-pixel shift. Each texel block is processed by one channel of the graphics processing unit.

Figure 7B:
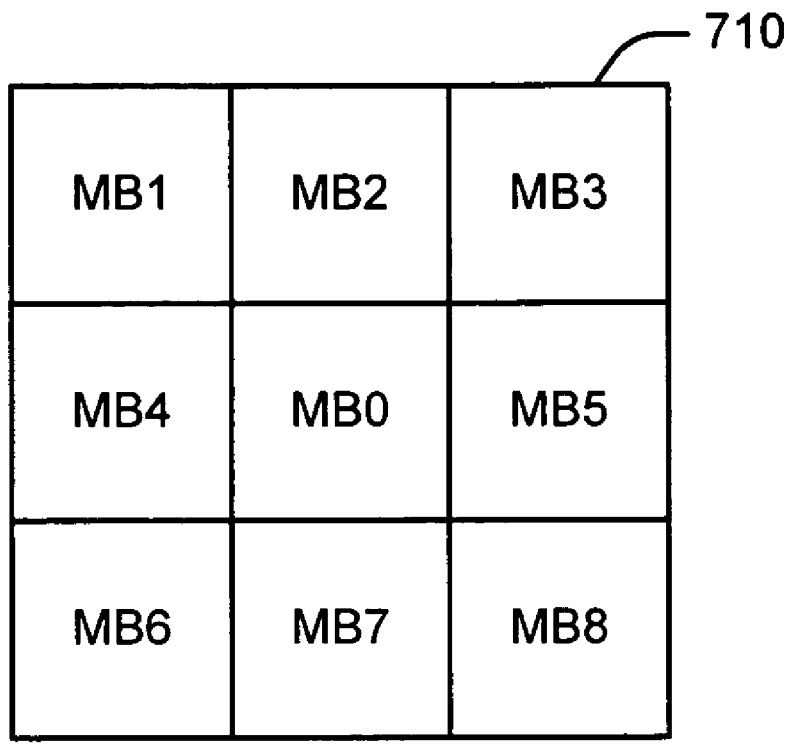
FIG. 7B shows an example of neighboring macroblocks.

FIG. 7B shows an example of neighboring macroblocks. A good initial prediction of motion vector is important to various fast search methods. A new motion vector prediction method is developed for GPU-based motion search. Existing motion vector prediction methods typically use motion vectors of neighboring macroblocks to predict the motion vector of a current macroblock. In order to repeat the prediction, left, top, and top-left motion vectors are used to ensure the prediction is causal. This technique may be implemented by a CPU-based motion vector search because CPU-based motion vector search finds motion vectors on a macroblock-by-macroblock basis. Thus, the motion vectors for the left, top and top-left motion vectors are available for prediction purpose. However, a GPU-based motion search may have to process all the macroblocks together. As a result, it may not be possible to predict the motion vector for a macroblock using the motion vectors of its neighboring macroblocks because motion vectors may not be available for the neighboring macroblocks.

In one implementation, the motion vectors of a previous frame are used to predict those of a current frame. Since the neighboring motion vectors of the previous frame are available, more neighboring motion vectors may be utilized. This prediction technology for GPU-based motion search may be referred to as Adaptive Temporal Motion Vector Field Prediction. The method may include local motion activity detection and motion seed selection.

Adaptive Temporal Motion Vector Field Prediction may include several steps. The collocated macroblock in the previous frame corresponding to the current macroblock that needs a predicted motion vector is found. In FIG. 7B, the current macroblock is illustrated as MB0 and the neighboring macroblocks are illustrated as MB1-MB8. Let V={V0, V1, . . . , V8}, where Vi is the motion vector of MBi. The city-block length of Vi=(xi,yi) is defined as lvi=|xi|+|yi|. Let L=MAX{lvi} for all Vi. The motion activity at the position of MB0 is defined as:

$$\text{Motion Activity} = \text{Low}, \quad \text{if } L \le L1$$
$$= \text{Medium}, \quad \text{if } L1 < L < L2$$
$$= \text{High}, \quad \text{if } L \ge L2$$

where L1 and L2 are predetermined threshold values.

The choice of the motion seed depends on the local motion activity at the MB0 position. If the motion activity is low or medium, the search center (i.e., the seed) is the (0,0). Although the search center is (0,0), the search pattern may be different. If the motion activity is high, the following procedure may be applied:

1) The sign of the predicted motion vector is set to be the majority among those of V0 to V8.
2) The value of the predicted motion vector is set to be the mean (or median) value of V0 to V8. The procedure applies to x and y direction separately.

In the motion estimation process, the vertex stream may need to be prepared in advance. CPU time may be needed to set up a vertex stream. However, a good prediction may be beneficial to fast motion vector search algorithms. Therefore, the speed of the motion estimation process may be adversely affected if CPU is configured to prepare the vertex stream after the motion vector prediction is made. Using the CPU in such a manner may also require the vertex buffer to be dynamic, which also brings penalty to the speed.

The described systems and methods may be configured to store the predicted motion vectors as a texture and to transfer the motion vector texture to the GPU. When sampling the reference texture, the pixel shader of a GPU may take into account the motion vectors texture in the sampler stage. As a result, the motion vector prediction is reflected in the motion vector search process. In this case, the vertex stream will be static (deterministic according to a specific MV search algorithm) and may be put to the static buffer, which is fastest.

Figure 8:
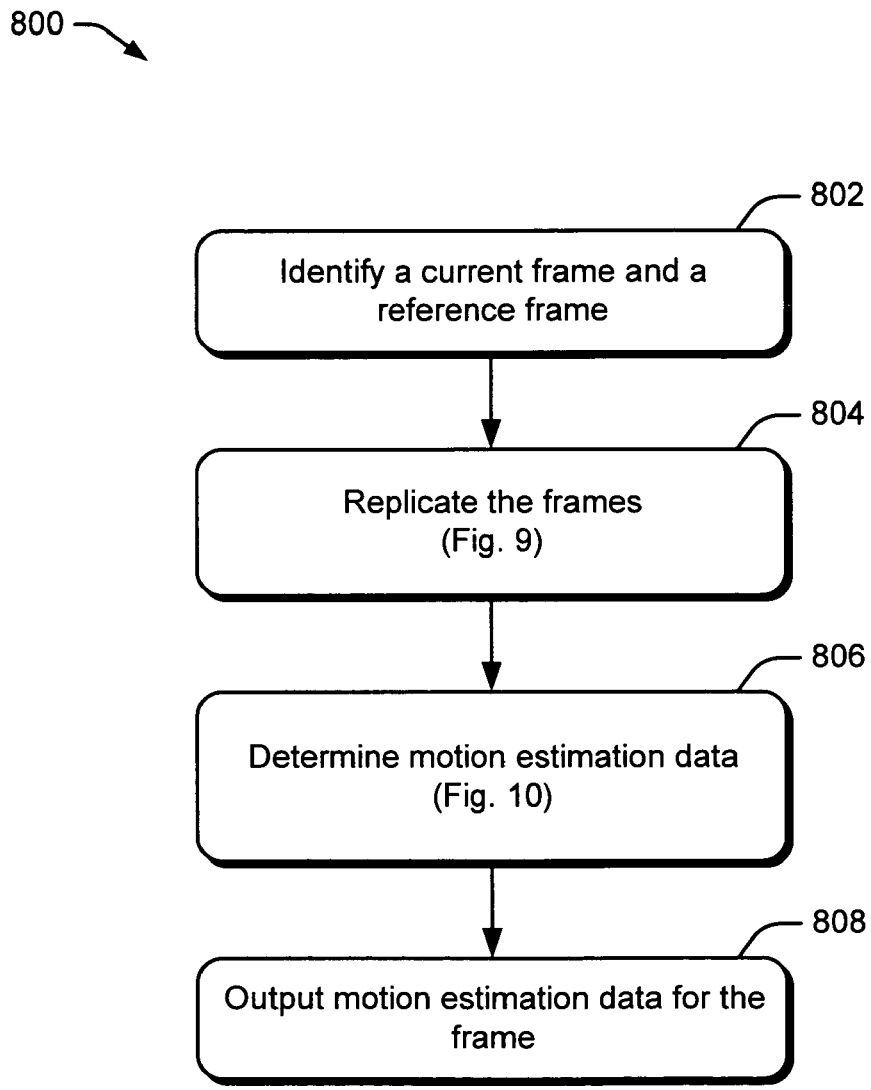
FIG. 8 shows an example process performing motion estimation on a frame of a video signal.

FIG. 8 shows an example process 800 for performing motion estimation on a frame of a video signal. Process 800 may be implemented by a graphics processing unit to determine motion estimation data. At block 802, a current frame and a reference are identified. The graphics processing unit may identify the frames from data provided by another processing component, such as a central processing unit. The graphics processing unit may also identify the frames directly from memory or an I/O component.

At block 804, the frames are replicated in preparation for motion estimation processing. An example frame replication process will be discussed in conjunction with FIG. 9. Briefly stated, the frames are padded and collocated so that they may be readily processed by a graphics processing unit.

At block 806, motion estimation data is determined. Motion estimation data may include motion vectors. Motion vectors are determined by comparing blocks of the current frame with blocks of the reference frame. An example process for determining motion estimation data will be discussed in conjunction with FIG. 10. At block 808, the motion estimation data for the current frame is outputted. The motion estimation data may be provided by the graphics processing unit to a central processing unit. The central processing unit may use the motion estimation data to encode the current frame into a digital video data stream.

Figure 9:
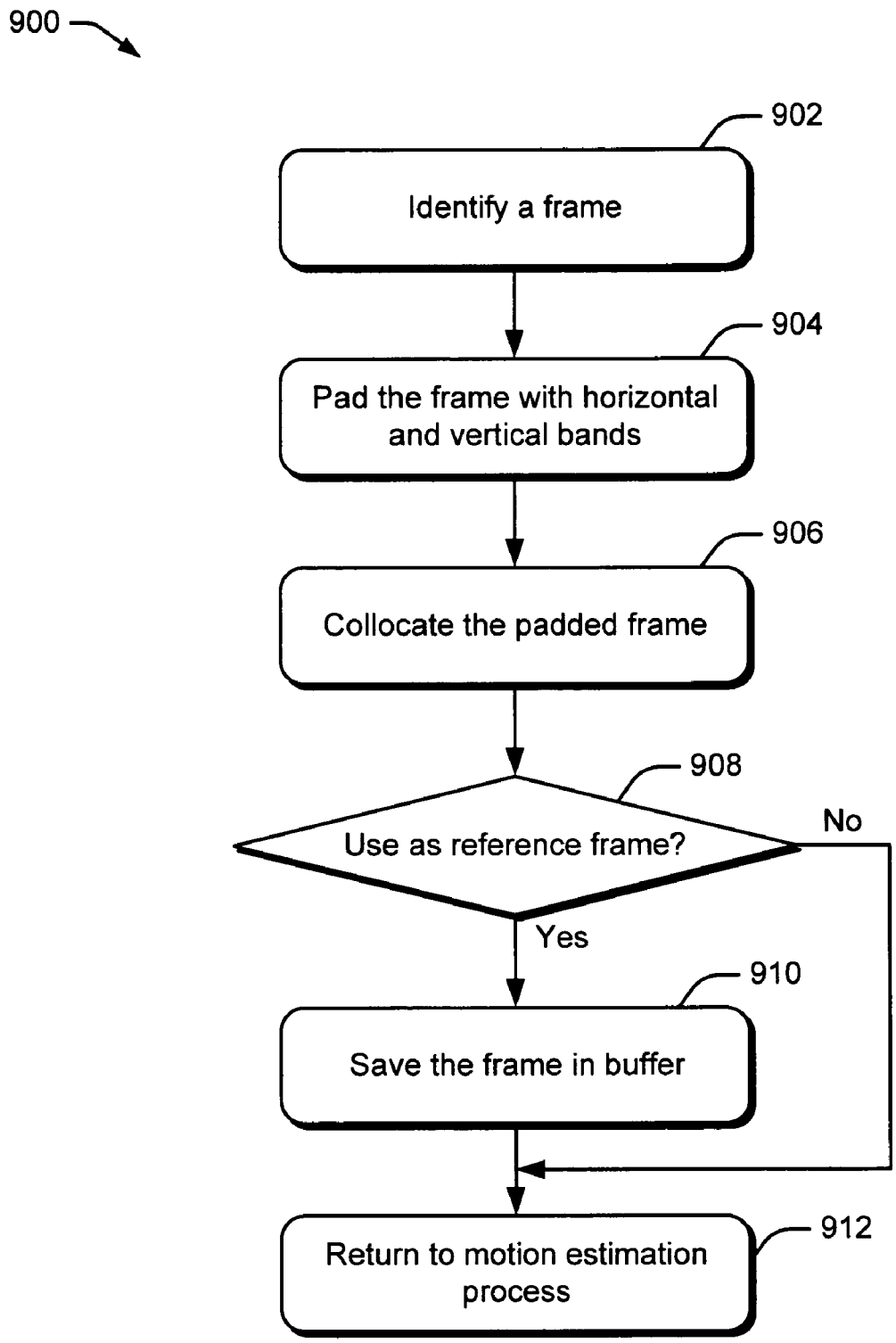
FIG. 9 shows an example process for replicating a frame.

FIG. 9 shows an example process 900 for replicating a frame. Process 900 may be used by a graphics processing unit to prepare a frame for motion estimation. At block 902, a frame of a video signal is identified. At block 904, the frame is padded with horizontal and vertical pixel bands. Padding the frame allows pixels at the edges of the frame to be properly processed by providing those edge pixels with neighboring pixels.

At block 906, the padded frame is collocated. Collocating a frame involves making copies of the frame so that each channel of a graphics processing unit can process the frame in parallel. At decision block 908, a determination is made whether the frame being processed will be used as a reference frame for processing another frame. If the frame will not be used as a reference frame, process 900 moves to block 912.

Returning to decision block 908, if the frame will be used a reference frame, process 900 goes to block 910 where the frame is saved in a buffer. Buffering the frame enables the graphics processing unit to continue processing sequential frames without having to retrieve frames that have already been processed. At block 912, process 900 returns to the motion estimation process.

Figure 10:
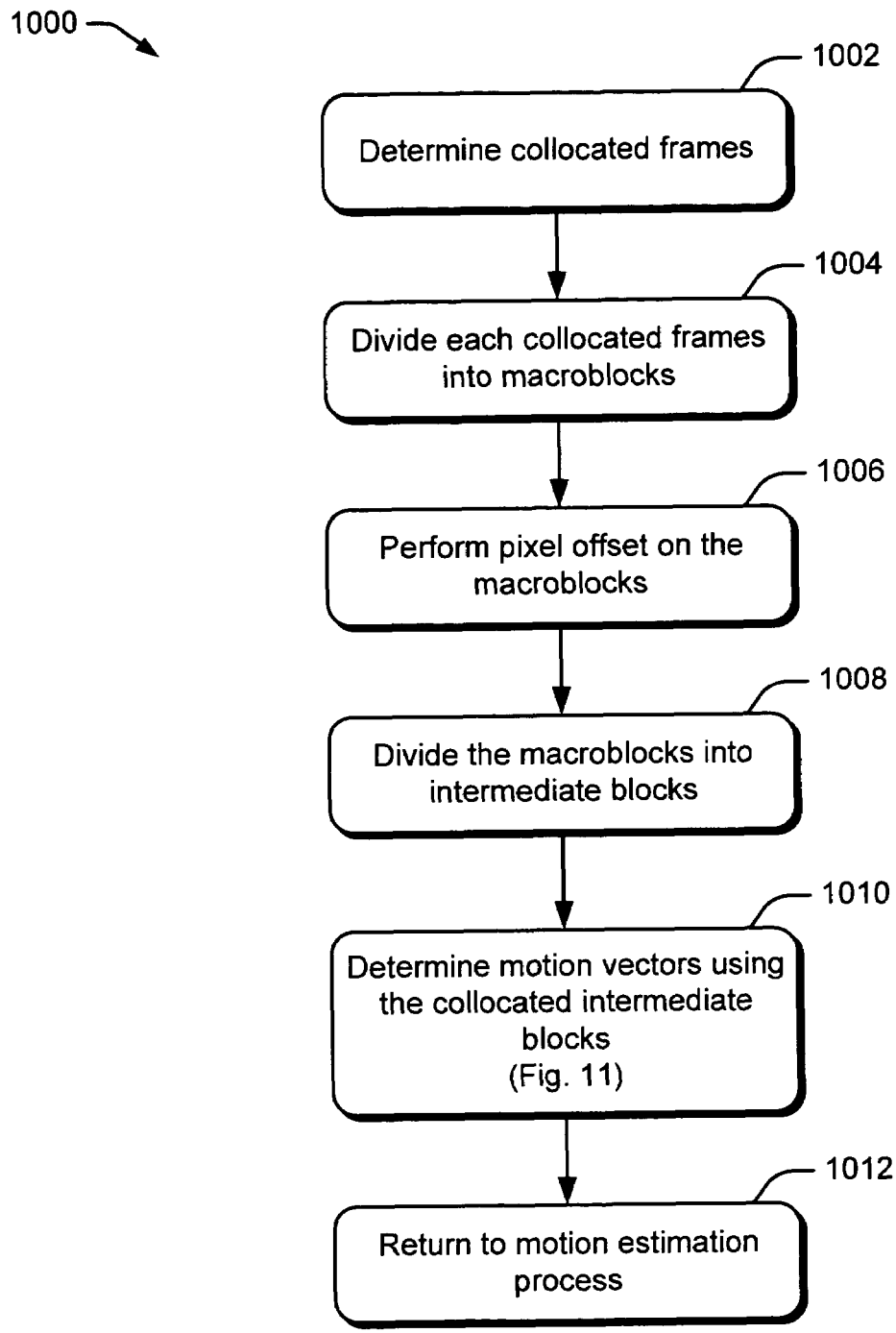
FIG. 10 shows an example process for determining motion vectors using collocated frames.

FIG. 10 shows an example process 1000 for determining motion vectors using collocated frames. Process 1000 may be implemented by a graphics processing unit to perform motion estimation for a frame. At block 1002, collocated frames associated with a current frame and a reference frames are determined. At block 1004, each collocated frames are divided into macroblocks. Macroblocks may have any dimension, such as 16×16 pixels. At block 1006, pixel offset are performed on the macroblocks of the collocated frames. Offsetting pixels in macroblocks of the collocated frames enables different sections of the current frame to be processed by different channels of the graphics processing unit in parallel. Pixels of macroblocks of different collocated frames can be sequentially offset by a fixed amount. Process 1000 can use any pixels offset. Offset of one to four pixels may be used with good results.

At block 1008, the macroblocks are divided into intermediate blocks. The intermediate blocks allow shaders of a graphics processing unit to readily process the frames. Shaders are configured to process texels of a texture and may only be able to process a limited number of texels at each channel at one time. In one implementation, intermediate blocks of 8 pixels from each collocated frame are used to provide data to four channels of the graphics processing unit.

At block 1010, motion vectors are determined using the collocated intermediate block. The graphics processing unit may receive seeding information to search for the motion vectors. At block 1012, process 1000 returns to the motion estimation process.

Figure 11:
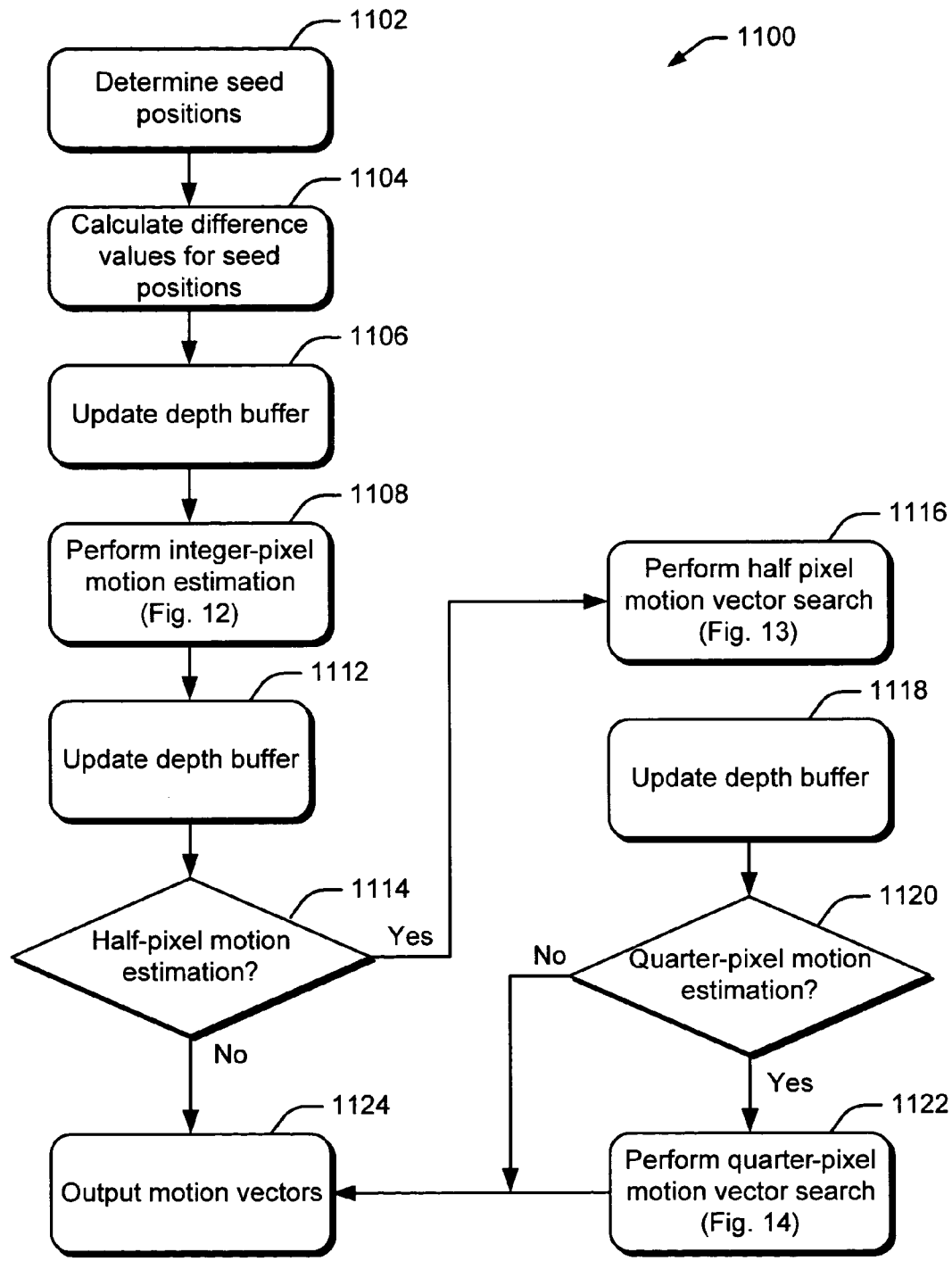
FIG. 11 shows an example process for accelerating a motion estimation procedure using a depth buffer.

FIG. 11 shows an example process 1100 for accelerating a motion estimation procedure using a depth buffer. Process 1100 may be implemented by a graphics processing unit to determine and provide motion vectors for encoding a frame. At block 1102, seed positions for starting motion vector search are determined. The seed positions may be provided by another processing component, such as a central processing unit. Each seed position creates a search window that enables the graphics processing unit to determine a motion vector without searching the entire frame.

At block 1104, difference values are calculated for the seed positions. The difference values may include any value that represents differences, such as a sum of absolute difference (SAD) value. At block 1106, the depth buffer is updated after the difference values are determined. The depth buffer may be used to indicate or flag a macroblock with a difference value that exceeds a predetermined threshold. By using the depth buffer in such as manner, the motion estimation process does not have to repeatedly search macroblocks that already have a satisfactory difference value.

In one implementation, before the search process begins, the depth buffer is initialized to a particular value such that the blocks to be rendered will pass the depth test. Thus, all the seed points will be searched. For some fast algorithms, the motion vector search for a macroblock may be stopped as long as the resulting SAD is satisfactory as determined by some thresholds. For these fast search algorithms, the threshold value can be used to control how to update the depth buffer. For example, for satisfactory search point, the corresponding depth buffer can be set to some value such that the associated blocks will not pass the depth test. As a result these macroblocks will not be searched again during the rest of the search process.

The D3DCMP_LESS test condition can be used as an example. Assume the depth range is [0.0, 1.0]. The depth value of the current block obtained by the vertex shader is 0.5. Initially, the depth buffer of the render surface is set to 1.0. As a result, all of the seed points will pas calculated. After searching the seed positions, if SADs of some blocks are considered to be satisfactory, the depth buffer value of the corresponding block will be updated from 1.0 to 0.0. As a result, these blocks will not be rendered in the rest searching passes. The same depth buffer update operation may be performed after the integer-pixel and half-pixel motion vector search. In these two operations, the depth buffer is used to control if the macroblock will undergo the motion search process. For example, if the current depth is 0.5 and corresponding block in the render surface has depth is 0.0, then this macroblock will not be search in the current iteration.

At block 1108, an integer-pixel motion estimation is performed. An example process for perform integer-pixel motion estimation will be discussed in conjunction with FIG. 12. At block 1112, the depth buffer is updated during the motion vector search process to control if a particular macroblock will undergo the process.

At decision block 1114, a determination is made whether to perform half-pixel motion estimation. If not, process 1110 goes to block 1124 where the determined motion vectors are outputted. If half-pixel motion estimation is to be performed, the process moves to block 1116 where half-pixel motion estimation is performed. An example process for perform half-pixel motion estimation will be discussed in conjunction with FIG. 13. At block 1118, the depth buffer is updated during the motion vector search process.

At decision block 1120, a determination is made whether to perform quarter-pixel motion estimation. If quarter-pixel motion estimation is to be performed, the process moves to block 1122 where quarter-pixel motion estimation is performed. An example process for perform quarter-pixel motion estimation will be discussed in conjunction with FIG. 14. If quarter-pixel motion estimation will not be performed, process 1110 goes to block 1124 where the determined motion vectors are outputted.

Figure 12:
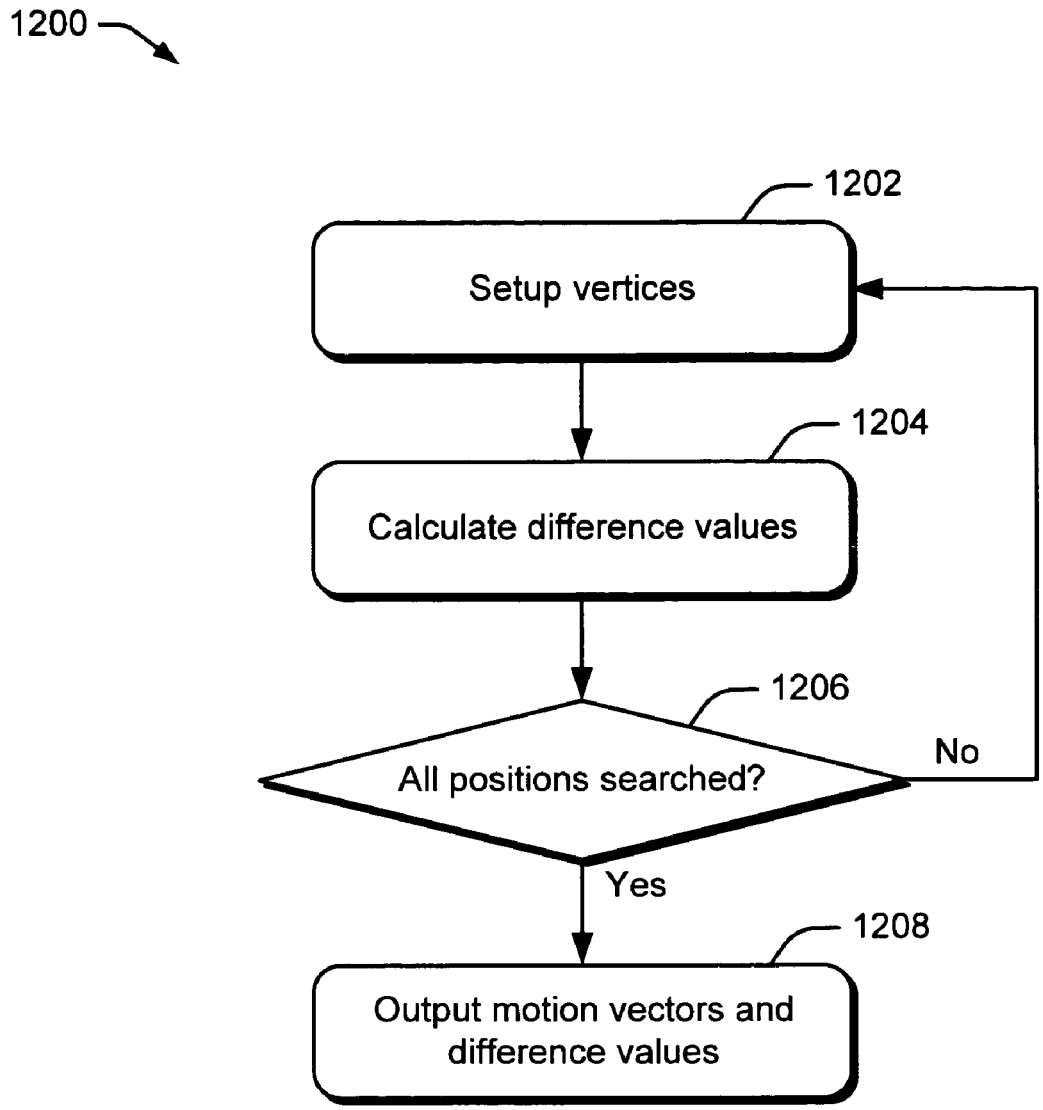
FIG. 12 shows an example process for perform integer-pixel motion estimation.

FIG. 12 shows an example process for perform integer-pixel motion estimation. Process 1200 may be implemented by a graphics processing unit. At block 1202, vertices are setup. For example, the vertex shader of the graphics processing unit may calculate the vertices for the macroblocks that needs motion vectors and the reference macroblocks, according to the vertex stream input. The vertex stream may be prepared by the CPU. Different motion estimation algorithms may result in different vertex stream and different vertices setup.

At block 1204, difference values are calculated. Difference values calculation may be performed for the macroblocks of the entire frame. The operation may be repeated until all of the search points determined by the motion estimation algorithm are checked. The motion vectors from the integer-pixel motion estimation may be used as the seed for more precise techniques, such as a half-pixel search.

At decision block 1206, a determination is made whether all positions have been searched. If not, process 1200 returns to block 1202. If all positions have been searched, the process goes to block 1208 where the determined motion vectors and difference values are outputted.

Figure 13:
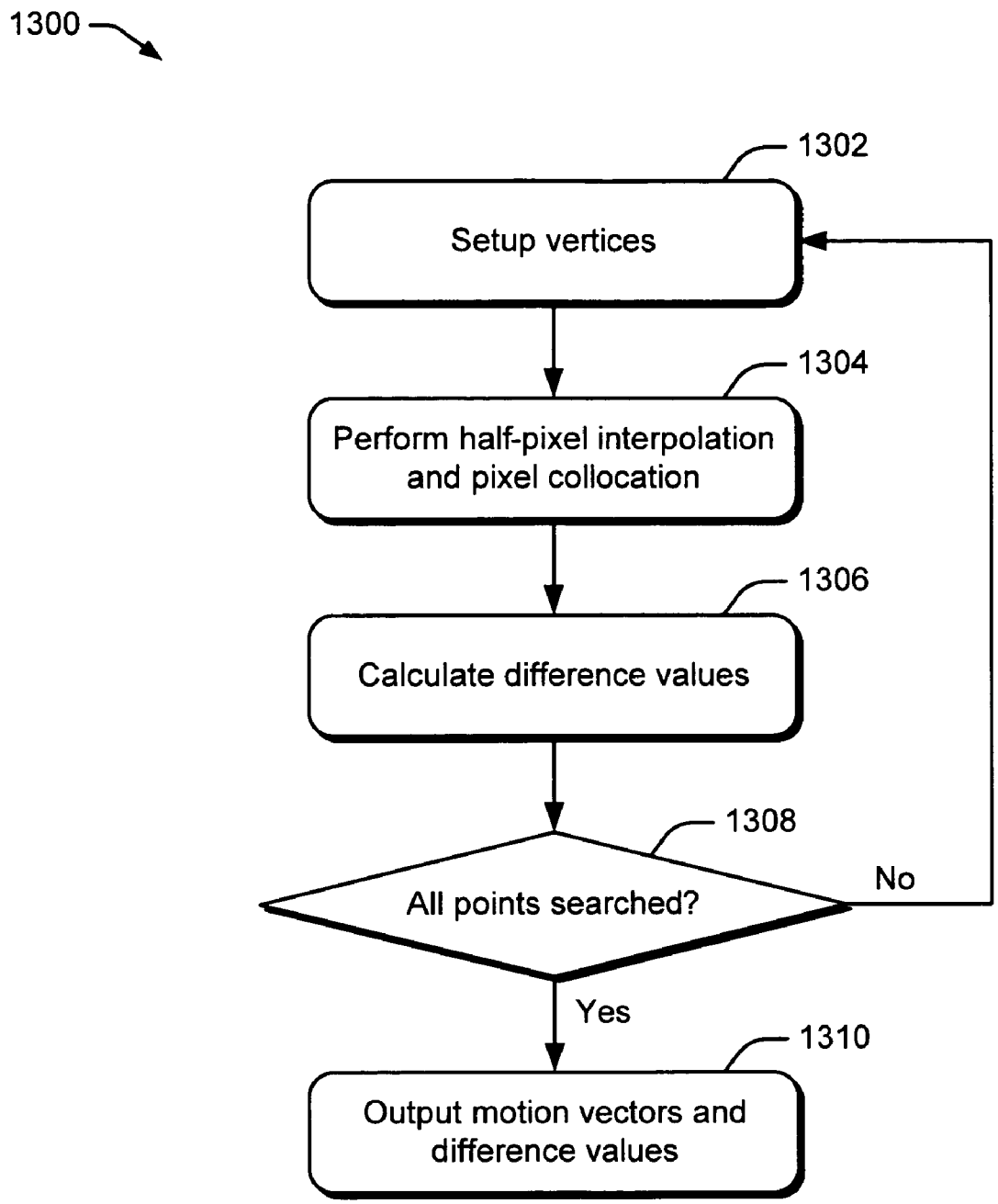
FIG. 13 shows an example process for perform half-pixel motion estimation.

FIG. 13 shows an example process for perform half-pixel motion estimation. At block 1302, vertices are setup. With the best motion vectors from the integer-pixel motion estimation process as the seed, a vertex shader may set up the vertices of the macroblocks in the reference frame(s) around the seed positions. At block 1304, half-pixel interpolation and pixel collocation are performed. The half-pixel interpolation may be performed by a pixel shader. Arbitrary interpolation filter can be supported. Interpolation files may be a bilinear filter. At block 1306, difference values are calculated.

At decision block 1308, a determination is made whether all points (i.e. pixel candidates) have been searched. If not, process 1300 moves back to block 1302. If all points have been searched, the process goes to block 1310 where the determined motion vectors and difference values are outputted.

Figure 14:
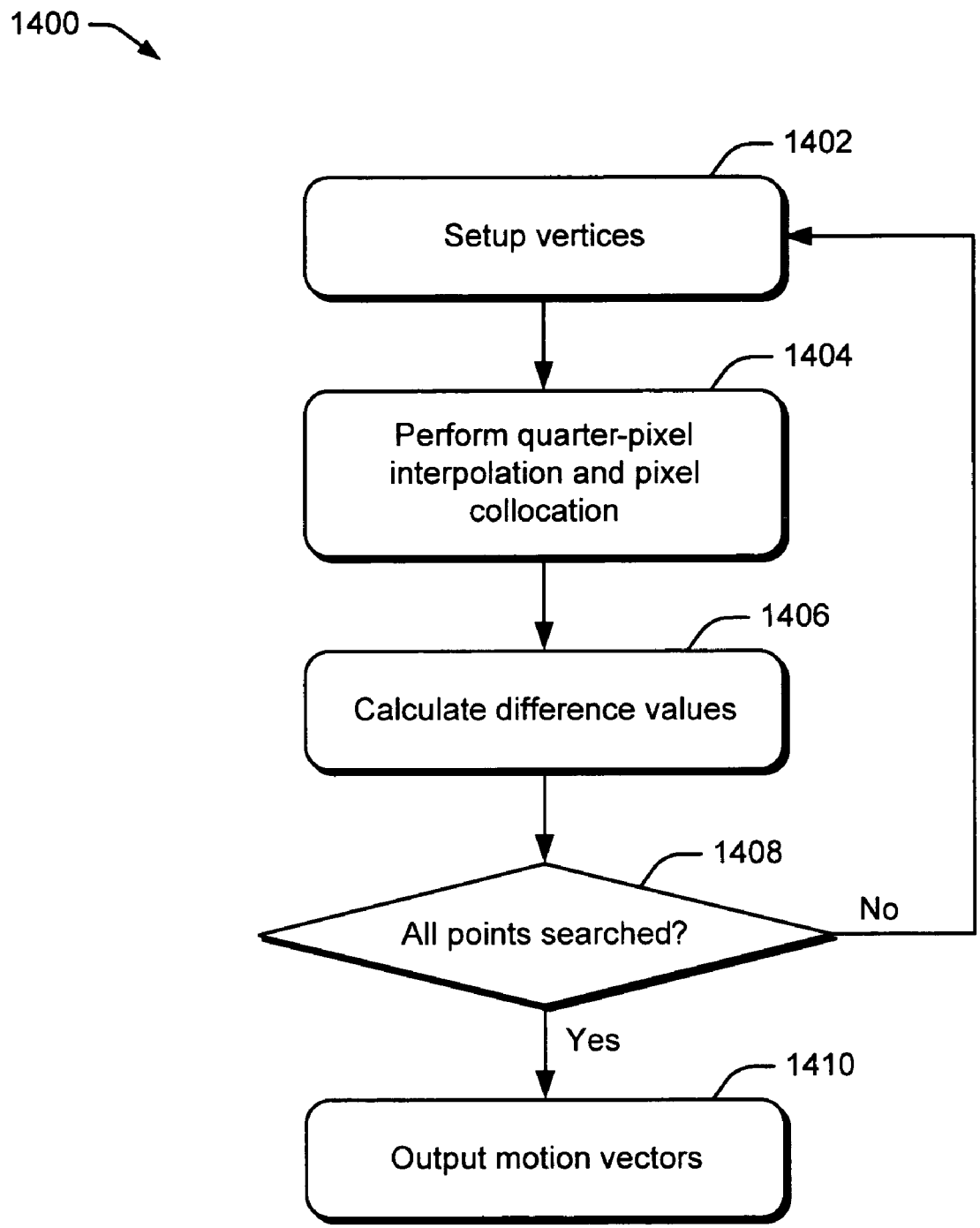
FIG. 14 shows an example process for perform quarter-pixel motion estimation.

FIG. 14 shows an example process for perform quarter-pixel motion estimation. At block 1402, vertices are setup with the best motion vectors from the half-pixel motion estimation process as the seed. A vertex shader may set up the vertices of the macroblocks in the reference frame(s) around the seed positions. At block 1404, quarter-pixel interpolation and pixel collocation is performed. A bi-cubic filter may be used. At block 1406, difference values are calculated.

At decision block 1408, a determination is made whether all points (i.e. pixel candidates) have been searched. If not, process 1400 moves back to block 1402. If all points have been searched, the process goes to block 1410 where the determined motion vectors are outputted. The motion vectors of all macroblock may be transferred to the CPU for further processing.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method for processing a video signal, Comprising, at least two or more processors implementing:
    determining a reference frame associated with a current frame;
    partitioning the current and reference frames into blocks;
    identifying seed positions;
    storing with a second processing unit the current frame of the video signal;
    identifying corresponding blocks in the current and the reference frames with a first processing unit;
    computing motion estimation vectors associated with the current frame using the first processing unit, the first processing unit including a first memory, and dedicated instructions stored in the first memory to perform vertex shader, pixel shader and texel processing, the first processing unit including multiple channels for texel processing, the vertex shader processing, graphics operations on a per-vertex basis and the pixel shader processing graphics operations on a per-pixel basis;
    determining difference values for blocks in the current frame based, at least in part, on the seed positions wherein the difference values include at least one of a sum of absolute difference (SAD) value, a mean square error (MSE) value, or a R-D based metric value, wherein determining the difference values of a reference texel block at one position enables extraction of the difference values for a reference pixel block for corresponding texel channels of the first processing unit;
    generating motion vectors for the blocks based, at least in part, on the difference values; and
    encoding the video signal into digital video data using the second processing unit running asynchronously to the first processing unit, said second processing unit including a second memory, separate from the first memory and having instructions stored in the second memory, wherein the current frame is encoded into the digital video data based, at least in part, on the computed motion estimation vectors computed using the first processing unit.

2. The method as recited in claim 1, wherein the first processing unit is a graphics processing unit (GPU), and wherein the method further comprises collocating the current frame into different portions; and
    processing, with the GPU using the multiple channels, different portions of the frame such that each channel of the GPU performs texel processing on the different portions of the current frame in parallel.

3. The method as recited in claim 1, wherein the motion estimation data further include a motion vector.

4. The method as recited in claim 1, wherein each block is at least one of 16 pixels by 16 pixels, 8 pixels by 8 pixels, or 4 pixels by 4 pixels.

5. The method as recited in claim 1, further comprising, identifying a particular block using a depth buffer if the difference value for the particular block is satisfactory based on a predetermined threshold.

6. The method as recited in claim 1, further comprising:
    representing information about the blocks as vertex data; and
    processing the vertex data using a vertex shader function of the first processing unit.

7. The method as recited in claim 1, further comprising using the first processing unit to generate the motion vector using half-pixel motion estimation.

8. The method as recited in claim 1, further comprising using the first processing unit to generate the motion vector using quarter-pixel motion estimation.

9. The method as recited in claim 1, further comprising saving the motion estimation data associated with the current frame.

10. The method as recited in claim 9, further comprising determining motion estimation data for a next frame using the motion estimation data associated with the current frame.

11. A computer-readable medium encoded with computer-executable instructions for performing the method recited in claim 1.

12. An apparatus for processing a video signal comprising:
    a central processing unit (CPU) to extract a current frame from the video signal and store the extracted frame in a first memory, the CPU further to receive motion estimation data associated with the current frame and to encode the current frame into digital video data using the motion estimation data; and a graphics processing unit (GPU) including a second memory, multiple processing channels and dedicated instructions stored in the second memory, exclusive of the first memory, to perform texel processing using the multiple processing channels, said GPU to determine a reference frame associated with the current frame and to generate, using texel processing by the multiple processing channels, the motion estimation data for the current frame based, at least in part, on comparing the current frame and the reference frame.

13. The apparatus as recited in claim 12, wherein the graphics processing unit includes a vertex shader to process the vertex data.

14. The apparatus as recited in claim 13, wherein the vertex shader calculates difference values associated with macroblocks of the current and reference frames, and to generate motion vectors based, at least in part, on the difference values.

15. The apparatus as recited in claim 14, wherein the graphics processing unit further includes a depth buffer in the memory and wherein if the difference value for a particular macroblock is satisfactory based on a predetermined threshold, identifying the macroblock using the depth buffer.

16. The apparatus as recited in claim 14, wherein the graphics processing unit calculates the difference values by performing at least one of integer-pixel motion estimation, half-pixel motion estimation, or quarter-pixel motion estimation.

17. The apparatus as recited in claim 16, wherein the graphics processing unit further includes a pixel shader and wherein the pixel shader performs at least one of the integer-pixel motion estimation, the half-pixel motion estimation, or the quarter-pixel motion estimation.

18. The apparatus as recited in claim 17, wherein the pixel shader pads the current frame with horizontal and vertical bands.

19. The apparatus as recited in claim 12, wherein the graphics processing unit saves the motion estimation data in a buffer for processing a next frame associated with the current frame.

20. The apparatus as recited in claim 12, wherein the central processing unit encodes the digital video data by performing at least one of motion compensated prediction, discrete cosine transform, quantization, variable length coding, inverse quantization or inverse discrete cosine transform.

21. The apparatus as recited in claim 12, wherein the central processing unit encodes into the digital video data at least one of an Intra frame (I-frame), a predicted frame (P-frame) or a bi-directional predicted frame (B-frame).

22. The apparatus as recited in claim 12, further comprising a memory module to store data used by the central processing unit, wherein the memory module is shared by the central processing unit and the graphics processing unit.

23. A computer-readable medium encoded with data associated with a graphics processing unit, the computer-readable storage medium comprising:
a first data field representing a current frame in a video signal;
a second data field representing a reference frame in the video signal; and
a third data field including motion estimation data, including a difference value of at least one of a motion vector, a sum of absolute difference (SAD) value, a mean square error (MSE) value, or a R-D based metric value associated with the current frame, the difference value being calculated for one reference texel macroblock at one position enabling extraction of four reference pixel macroblocks from four corresponding texel channels of the graphics processing unit based on the data in the first and second data field.

24. The computer-readable storage medium as recited in claim 23, wherein the data in the first and second data fields is arranged as pixel blocks and wherein each pixel block represents a port ion of the current and reference frames.

25. The computer-readable storage medium as recited in claim 24, wherein the pixel blocks are represented by vertices that can be processed by a vertex shader in the graphics processing unit.

26. The computer-readable storage medium as recited in claim 24, wherein the motion estimation data in the third data field includes difference values and wherein each difference value is associated with a pixel block in the first data field and a corresponding pixel block in the second data field.

27. The computer-readable storage medium as recited in claim 26, further comprising a fourth data field including depth data associated with each pixel block, wherein the depth data associated with a particular pixel block includes a flag indicating the pixel block is to be by-passed if the difference value for the particular pixel block is satisfactory based on a predetermined threshold.

28. The computer-readable storage medium as recited in claim 23, wherein the current frame includes at least one of an Intra frame (I-frame), a predicted frame (P-frame) or a bi-directional predicted frame (B-frame).

29. An apparatus comprising:
means for receiving video signal;
means for determining motion estimation data associated with the video signal using parallel processing of different portions of a frame of the received video signal with multiple texel channels in a graphics processing unit,
means for determining a difference value including at least one of a motion vector, a sum of absolute difference (SAD) value, a mean square error (MSE) value, or a R-D based metric value,
means for the graphics processing unit to represent the frame as macroblocks;
means to calculate the difference value for one reference texel macroblock
means to extract multiple reference pixel macroblocks from the corresponding multiple texel channels of the graphics processing unit;
means for communicating the motion estimation data to a central processing unit; and
means for the central processing unit to encode the video signal into digital video data using the motion estimation data.

30. The apparatus as recited in claim 29, further comprising means for the graphics processing unit to determine the motion estimation data for multiple frames before the central processing unit encodes any of the frames into the digital video data.

31. The apparatus as recited in claim 29, further comprising:
means for the graphics processing unit to represent the macroblocks as data that can be processed by a vertex shader.

32. The apparatus as recited in claim 29, further comprising means for using a depth buffer in the graphics processing unit to indicate that a particular macroblock is to be by-passed if a difference value associated with the particular macroblock is satisfactory based on a predetermined threshold.

33. The apparatus as recited in claim 29, further comprising:
    means for the graphics processing unit to buffer the motion estimation data associated with the frame; and
    means for using the buffered motion estimation data to process a next frame in the video signal.

34. The method as recited in claim 1, wherein the first processing unit is a graphics processing unit (GPU), and wherein the method further comprises:
    collocating the current frame into different blocks;
    representing information about the blocks as vertex data;
    processing the vertex data using a vertex shader function of the GPU;
    processing, different blocks of the frame, wherein each block is at least one of 16 pixels by 16 pixels, 8 pixels by 8 pixels, or 4 pixels by 4 pixels, such that each channel of the GPU performs texel processing on the different blocks of the current frame in parallel;
    saving the motion estimation data associated with the current frame; and
    determining motion estimation data for a next frame using the motion estimation data associated with the current frame.

35. The apparatus as recited in claim 12, the GPU further comprising a vertex shader, a depth buffer, and a pixel shader:
    wherein the vertex shader processes the vertex data; calculates difference values associated with macroblocks of the current and reference frames, the difference values calculated by at least one of integer-pixel motion estimation, half-pixel motion estimation, or quarter-pixel motion estimation; and generates motion vectors based, at least in part, on the difference values;
    the depth buffer defined in the second memory and wherein if the difference value for a particular macroblock is satisfactory based on a predetermined threshold, identifying the macroblock using the depth buffer; and
    wherein the pixel shader performs at least one of the integer-pixel motion estimation, the half-pixel motion estimation, or the quarter-pixel motion estimation and pads the current frame with horizontal and vertical bands.

36. The computer-readable storage medium as recited in claim 23, wherein the data in the first and second data fields are arranged as pixel blocks represented by vertices that can be processed by a vertex shader in the GPU, and wherein each pixel block represents a portion of the current and reference frames, the current frame including at least one of an intra frame (I-frame), a predicted frame (P-frame) or a bi-directional predicted frame (B-frame);
    the motion estimation data in the third data field includes difference values, wherein each difference value is associated with the pixel block in the first data field and a corresponding pixel block in the second data field; and
    a fourth data field, including depth data associated with each pixel block, wherein the depth data associated with a particular pixel block includes a flag indicating the pixel block is to be by-passed if the difference value for the particular pixel block is satisfactory based on a predetermined threshold.

37. The apparatus as recited in claim 29, further comprising:
    means for the GPU to determine the motion estimation data for multiple frames before the CPU encodes any of the frames into the digital video data;
    means for the GPU to represent the macroblocks as data that can be processed by a vertex shader;
    means for using a depth buffer in the GPU to indicate that a particular macroblock is to be by-passed if a difference value associated with the particular macroblock is satisfactory based on a predetermined threshold;
    means for the GPU to buffer the motion estimation data associated with the frame; and
    means for using the buffered motion estimation data to process a next frame in the video signal.

\* \* \* \* \*